McC. YOUNG.

Axle-Lubricator.

No. 51,773.

Patented Dec. 26, 1865.

Witnesses:  Inventor:

UNITED STATES PATENT OFFICE.

McCLINTOCK YOUNG, OF FREDERICK, MARYLAND.

IMPROVEMENT IN CARRIAGE-WHEEL HUBS.

Specification forming part of Letters Patent No. 51,773, dated December 26, 1865.

*To all whom it may concern:*

Be it known that I, McCLINTOCK YOUNG, of Frederick, in the county of Frederick and State of Maryland, have invented a new and useful Improvement in Carriage and other Wheel Hubs and Axles, and the Manner of Oiling the same; and I do hereby declare the following to be a full, clear, and exact description of the same, reference being had to the accompanying drawings, making a part of this specification, in which—

Figure 1:
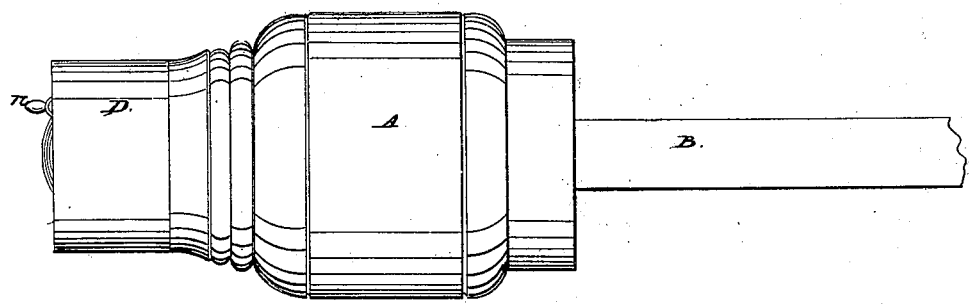
Figure 2:
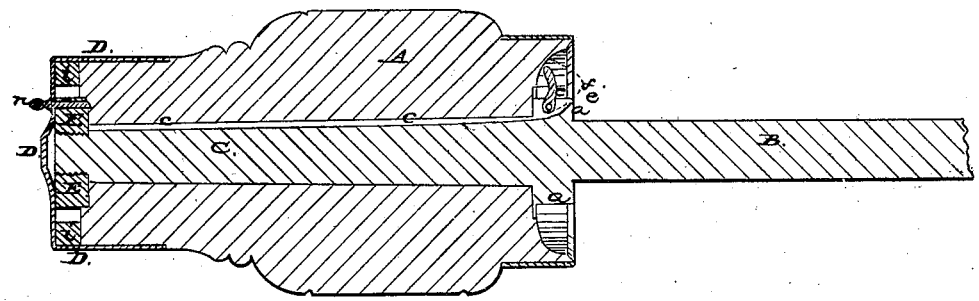
Figure 3:
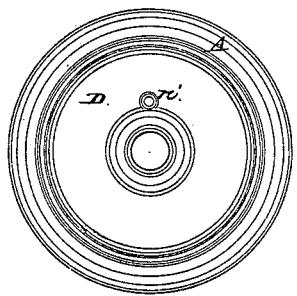
Figure 4:
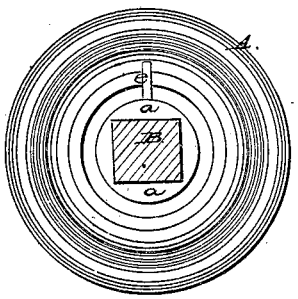

Figure 1 represents an external view of a hub and portion of an axle therein. Fig. 2 represents a longitudinal section through the same. Fig. 3 represents a view of the outer end of the hub—that is, the capped or banded end; and Fig. 4 represents the inner end, showing the axle in place.

Similar letters of reference, where they occur in the separate figures, denote like parts in all the drawings.

The use of oil or similar fluid lubricators is very desirable in oiling axles or journals of carriages, and would be universally adopted if proper means of introducing and retaining it were devised.

My invention has for its object the use of oil or other limpid or fluid lubricating material, and in easily introducing and retaining the same in the hub without dripping or soiling the parts or the hands of the user in introducing the lubricator, or in taking off or putting on the wheel, or in cleaning or burning out the hardened oil or other similar material from the groove or reservoir for containing it.

I am aware that a nut and hub band or cap have been so made, with an interposed locking mechanism, as that the nut may be run off from the point of the journal by turning the wheel; but the plan was so intricate and unreliable as to render it impracticable in general use.

My invention consists, first, in the manner of introducing, holding, and retaining oil or other fluid-lubricators in the hubs of wheels, or in or upon the journals of said hubs; and, secondly, it relates to the arrangement of the close band and nut, so that by the use of a pin from the outside the wheel may be run off without handling the nut or soiling the hands, while the nut remains in the hub and always in place to be run onto the journal when the wheel is to be replaced.

To enable others skilled in the art to make and use my invention, I will proceed to describe the same with reference to the drawings.

A represents a hub, and B an axle of any ordinary construction. The journal C of the axle has a collar, *a*, upon it, through which collar is cut or otherwise made a curved channel, *c*, which channel *c* is extended along on top of the journal toward or to its point. The channel or opening through the collar is furnished with a hinged stopper, *e*, which is represented as being raised up by the dark lines in Fig. 2, and as being down or closed by the red lines in the same figure. The stopper *e* has a projection, *f*, upon it, so that by the nozzle of the oil-can it can be raised up and held while the oil is poured in through the channel *c*. The object in curving the channel where it passes through the collar *a* is that a wire may be introduced and passed along the entire channel on the journal to clean it out or to burn it out with a heated wire, should the oil or other lubricator harden in the channel, and without taking off the wheel or soiling the hands. The channel will hold enough oil to supply the journal for several days' constant use. The point of the hub A is covered by a close band, D, which, beside being fastened to the hub in the usual way, may have one, two, or more lugs, *i i*, which are let into the wood of the hub to prevent the band from getting loose on the hub. The nut E, which is made round, is let into the end of the hub, and is held in permanent position in the band, even when the wheel is removed from the journal, so that in again replacing the wheel the journal will always find its nut without handling.

When the wheel, for any purpose, is to be removed from the axle or journal, a pin, *n*, is inserted in a hole made in the end of the band D until it reaches the nut, and then by gently pressing against the pin, and at the same time turning the wheel the pin will find and enter a similar hole in the nut E, and thus unite the band and nut, so that by turning the wheel backward the nut will be run off from the journal and the wheel slip off from the journal. In putting the wheel on again, the nut, which remains in the hub, will always be in position to receive the point of the journal without any handling of it, and simply turning the wheel runs the nut onto the journal and secures the wheel to the axle, and then the pin *n* is withdrawn.

Having thus fully described my invention, what I claim therein as new, and desire to secure by Letters Patent, is—

1. The channel *c* in or on the journal and curved outward and upward through the collar, and furnished with a hinged stopper, for the purpose of introducing, holding, and retaining a supply of oil or similar fluid lubricator, substantially as and for the purpose described.

2. In combination with the close band D and nut E, each furnished with a hole, a pin or stud introduced from the outside, for the purpose of forming a lock or tie between said band and nut to run the nut off from or onto the journal of the axle, substantially as herein described and represented.

McCLINTOCK YOUNG.

Witnesses:
   JNO. H. YOUNG,
   GRAFTON FOUT.